US011732792B2

(12) United States Patent
Arnault et al.

(10) Patent No.: US 11,732,792 B2
(45) Date of Patent: Aug. 22, 2023

(54) PULLEY DEVICE FOR A TENSIONER ROLLER OR WINDING ROLLER

(71) Applicant: Aktiebolaget SKF, Gothenburg (SE)

(72) Inventors: Benoit Arnault, Saint-Cyr-sur-Loire (FR); Mickael Chollet, Joué-Lès-Tours (FR); Nicolas Tronquoy, Fondettes (FR); Samuel Viault, Saint-Antoine-du-Rocher (FR)

(73) Assignee: Aktiebolaget SKF, Gothenburg (SE)

( * ) Notice: Subject to any disclaimer, the term of this patent is extended or adjusted under 35 U.S.C. 154(b) by 4 days.

(21) Appl. No.: 17/526,012

(22) Filed: Nov. 15, 2021

(65) Prior Publication Data

US 2022/0074481 A1    Mar. 10, 2022

Related U.S. Application Data

(63) Continuation of application No. 16/372,615, filed on Apr. 2, 2019, now Pat. No. 11,313,449.

(30) Foreign Application Priority Data

Apr. 19, 2018 (FR) ...................... 1853425

(51) Int. Cl.
*F16H 57/00* (2012.01)
*F16C 19/08* (2006.01)
(Continued)

(52) U.S. Cl.
CPC ......... *F16H 57/0031* (2013.01); *F16C 19/08* (2013.01); *F16H 7/12* (2013.01);
(Continued)

(58) Field of Classification Search
CPC ........ F16C 35/073; F16C 19/06; F16C 19/08; F16C 2361/63; F16C 13/006;
(Continued)

(56) References Cited

U.S. PATENT DOCUMENTS 622,214 A * 4/1899 Fletcher .................. B60L 5/06
                                                      191/63
1,627,558 A * 5/1927 Grunwald ............. F16C 13/006
                                                      29/524.1
(Continued)

FOREIGN PATENT DOCUMENTS

CN          203272722 U    11/2013
FR          2491182 A1     4/1982
(Continued)

*Primary Examiner* — Henry Y Liu
(74) *Attorney, Agent, or Firm* — Garcia-Zamor Intellectual Property Law, LLC; Ruy Garcia-Zamor

(57) ABSTRACT

A pulley device for a tensioner roller or winding roller of a transmission element, providing a pulley, and a bearing. The bearing includes a rotating outer ring mounted to the pulley, a fixed inner ring, and at least one row of rolling elements arranged between the rings. The inner ring of the bearing has at least one end portion protruding axially with respect to the outer ring. The pulley is provided with at least one pulley element that is C-shaped in axial section. One of the at least one pulley elements is provided with a lateral portion extending substantially radially to pass into the immediate vicinity of an outer surface of the axially protruding end portion of the inner ring.

20 Claims, 3 Drawing Sheets

(51) Int. Cl.
*F16H 7/12* (2006.01)
*F16H 55/36* (2006.01)
*F16H 7/08* (2006.01)

(52) U.S. Cl.
CPC .......... *F16H 55/36* (2013.01); *F16C 2361/00* (2013.01); *F16H 2007/0865* (2013.01)

(58) Field of Classification Search
CPC ......... F16C 2361/00; F16H 2007/0865; F16H 55/36; F16H 7/12; F16H 57/0031
USPC ....................................................... 474/199
See application file for complete search history.

(56) References Cited

U.S. PATENT DOCUMENTS

| | | | | |
|---|---|---|---|---|
| 2,610,514 A * | 9/1952 | Long, Jr. | ............... | B65H 57/14 474/902 |
| 2,655,813 A * | 10/1953 | Howell | ................... | F16H 55/36 384/547 |
| 3,722,968 A * | 3/1973 | Bomberger | ........... | F16C 33/767 384/492 |
| 3,772,928 A * | 11/1973 | Gobeille | ................ | F16H 55/48 474/902 |
| 3,815,959 A * | 6/1974 | Hill | ..................... | B60B 27/0005 301/5.301 |
| 3,898,888 A * | 8/1975 | Frost | ...................... | F16H 55/44 474/181 |
| 3,961,406 A * | 6/1976 | Frost | ...................... | F16H 55/44 29/892.11 |
| 4,025,132 A * | 5/1977 | Watanabe | .............. | F16C 33/805 384/130 |
| 4,113,328 A * | 9/1978 | Vander Meulen | ...... | F16C 33/78 384/492 |
| 4,265,133 A * | 5/1981 | Van Der Meulen | .... | F16H 15/10 474/182 |
| 4,294,491 A * | 10/1981 | Black | ................. | B60B 27/0094 301/105.1 |
| 4,441,692 A * | 4/1984 | Kovaleski | ............... | B66D 3/08 474/178 |
| 4,474,562 A * | 10/1984 | Heurich | ............... | F16H 7/1281 29/520 |
| 4,504,252 A * | 3/1985 | Honma | ................. | F16C 13/006 474/135 |
| 4,511,192 A * | 4/1985 | Hans | ..................... | F16H 7/1281 384/543 |
| 4,518,372 A * | 5/1985 | Dye | ...................... | F16C 13/006 474/94 |
| 4,580,846 A * | 4/1986 | Johnson | ................ | B60B 7/0013 29/898.07 |
| 4,602,875 A * | 7/1986 | Doerr | .................... | F16C 13/006 384/488 |
| 4,610,645 A | 9/1986 | Donn et al. | | |
| 4,610,646 A * | 9/1986 | Walter | ..................... | F16H 7/20 474/197 |
| 4,792,243 A * | 12/1988 | Takeuchi | ............ | F16C 33/7896 384/132 |
| 4,810,108 A * | 3/1989 | Yajima | ................... | F16C 35/12 384/488 |
| 4,863,293 A * | 9/1989 | Sytsma | .................. | F16C 33/60 384/477 |
| 5,630,769 A * | 5/1997 | Schmidt | ................ | F16C 13/006 474/902 |
| 5,725,448 A * | 3/1998 | Kato | ..................... | F16C 13/006 384/510 |
| 5,775,819 A * | 7/1998 | Kinney | .................. | F16C 33/60 384/449 |
| 6,220,982 B1 * | 4/2001 | Kawashima | ........... | F16H 55/44 384/536 |
| 6,241,257 B1 * | 6/2001 | Hauck | .................. | F16C 13/006 384/489 |
| 6,357,926 B1 * | 3/2002 | Hauck | .................. | F16C 33/76 384/546 |
| 6,854,893 B2 * | 2/2005 | Schmidt | ............. | F16C 33/7859 384/477 |
| 6,941,651 B2 * | 9/2005 | Radocaj | ................... | B21K 1/42 72/376 |
| 7,011,593 B2 * | 3/2006 | Schenk | ...................... | F16H 7/20 384/477 |
| 7,485,059 B2 * | 2/2009 | Fadler | ..................... | F16H 55/44 474/166 |
| 7,591,593 B2 * | 9/2009 | Tsujimoto | ........... | F16C 33/7896 384/486 |
| 7,695,385 B2 * | 4/2010 | Barraud | .................. | F16C 41/04 474/199 |
| 8,012,053 B2 * | 9/2011 | Filip | ......................... | F16H 7/20 474/49 |
| 8,172,056 B2 * | 5/2012 | Barraud | ................. | F16D 41/069 192/113.32 |
| 8,235,851 B2 * | 8/2012 | Eidloth | ............... | F16C 33/7859 474/199 |
| 9,086,139 B2 * | 7/2015 | Varnoux | ................ | F16C 13/006 |
| 9,416,863 B2 * | 8/2016 | Schaefer | ................ | F16H 55/48 |
| 9,452,580 B2 * | 9/2016 | Swane | ................... | F16H 55/48 |
| 9,464,700 B2 * | 10/2016 | Hedman | ................ | F16C 13/006 |
| 9,506,538 B2 * | 11/2016 | Hedman | ................ | F16H 7/20 |
| 10,030,758 B2 * | 7/2018 | Basile | .................... | F16H 55/36 |
| 10,088,031 B2 * | 10/2018 | Koda | .................... | F16H 55/44 |
| 10,228,051 B2 * | 3/2019 | Basile | ................... | F16H 55/566 |
| 2004/0097313 A1 * | 5/2004 | Singer | ................... | F16C 13/006 474/199 |
| 2004/0235599 A1 * | 11/2004 | Ozorak | ................... | F16C 35/02 474/170 |
| 2005/0026729 A1 * | 2/2005 | Schenk | ................... | F16H 7/20 474/166 |
| 2006/0153484 A1 * | 7/2006 | Ohata | .................... | F04B 27/0895 384/484 |
| 2006/0171622 A1 * | 8/2006 | Ohata | ................... | F16C 13/02 384/513 |
| 2007/0072714 A1 * | 3/2007 | Filip | ........................ | F16H 7/20 474/70 |
| 2007/0242909 A1 * | 10/2007 | Fournier | ............. | F16C 33/7896 384/132 |
| 2008/0132365 A1 * | 6/2008 | Boussaguet | ........... | F16C 33/723 474/136 |
| 2008/0230341 A1 * | 9/2008 | Barraud | ................ | F16C 33/581 192/41 A |
| 2009/0098967 A1 * | 4/2009 | Eidloth | ................ | F16C 33/6607 474/199 |
| 2009/0226124 A1 * | 9/2009 | Nakagawa | ............ | F16J 15/164 384/478 |
| 2009/0298630 A1 * | 12/2009 | Mineno | ................. | F16C 35/073 474/199 |
| 2011/0009220 A1 * | 1/2011 | Arnault | ................ | F16C 35/073 474/166 |
| 2012/0028745 A1 * | 2/2012 | Mola | .................... | F16C 13/006 474/166 |
| 2012/0142468 A1 * | 6/2012 | Lescorail | ............ | F16C 35/067 384/477 |
| 2012/0142470 A1 * | 6/2012 | Varnnoux | ............ | F16C 19/163 474/199 |
| 2013/0225344 A1 * | 8/2013 | Arnault | ................ | F16H 55/36 474/166 |
| 2013/0337952 A1 * | 12/2013 | Berruet | ................ | F16H 55/36 474/94 |
| 2013/0337953 A1 * | 12/2013 | Berruet | ................ | F16H 55/36 474/94 |
| 2014/0364258 A1 * | 12/2014 | Lescorail | ............ | F16H 55/36 474/150 |
| 2015/0141185 A1 * | 5/2015 | Albrecht | ............ | F16H 7/20 474/199 |
| 2015/0267791 A1 * | 9/2015 | Hedman | ................ | F16C 13/006 474/199 |
| 2015/0292603 A1 * | 10/2015 | Cherioux | ............ | F16C 33/7886 474/166 |

(56) References Cited

U.S. PATENT DOCUMENTS

2015/0300463 A1* 10/2015 Albrecht ............... F16C 33/586
　　　　　　　　　　　　　　　　　　　　　474/166
2016/0327146 A1* 11/2016 Lescorail ............. F16C 35/073

FOREIGN PATENT DOCUMENTS

FR　　　　3020108 A1　10/2015
GB　　　　2165615 A　　4/1986

* cited by examiner

PULLEY DEVICE FOR A TENSIONER ROLLER OR WINDING ROLLER

CROSS-REFERENCE

This application claims priority to and benefit of the following applications, as follows: this application is a continuation of and claims priority to and benefit of U.S. patent application Ser. No. 16/372,615 filed on Apr. 2, 2019, which claims priority to French patent application no. 1853425 filed on Apr. 19, 2018: each of the above identified applications is hereby incorporated herein by reference as if fully set forth in its entirety.

TECHNOLOGICAL FIELD

The present invention relates to the field of pulley devices for tensioner rollers or winding rollers that are intended to cooperate with a transmission element, for example a timing belt or chain or a drive belt or chain of a motor vehicle internal combustion engine.

BACKGROUND

Such rollers serve generally to permanently maintain tension in the transmission element in a given range or to locally modify the path taken thereby. The rollers are thus referred to as tensioner rollers and winding rollers, respectively. In winding rollers, the pulley is rotatably mounted on a threaded screw body via a bearing, the roller then being fixed directly or indirectly to the engine block or to an element of a tensioner roller device, for example an articulated arm or an eccentric.

The bearing generally comprises a fixed inner ring having a bore through which the screw passes, a rotating outer ring surmounted by the pulley, and at least one row of rolling elements interposed between the rings.

Such devices are often equipped with seals or additional protective flanges that help to protect the device from contaminants or spatter originating from the outside environment.

However, particles or other polluting elements can get in, and can build up over time in the immediate vicinity of the sealing means of the bearing. Since the sealing means can become worn, the risk of the pollution getting into the bearing chamber increases with the duration of use of the pulley device. This internal pollution can have the consequence of accelerated deterioration of the internal components of the bearing, in particular the contact surfaces between the rolling elements and the rings. This can result in a drop in the quality of the rotating mechanical connection provided by the pulley device, and a reduced service life of the internal components thereof. The risk of breakage, notably in operating mode, is also higher.

SUMMARY

The present invention aims to remedy this drawback.

More particularly, the present invention aims to provide a pulley device that is resistant to high levels of pollution, is particularly economical, is easy and safe to mount, forming a subassembly that is incapable of being dismantled, and has a smaller axial and radial space requirement.

The invention relates to a pulley device for a tensioner roller or winding roller of a transmission element, comprising a pulley and a bearing.

The bearing is provided with a rotating outer ring having an outer surface, a bore with at least one outer raceway, a forward lateral surface and a rear lateral surface. The bearing is also provided with a fixed inner ring with a bore that is able to take a body of a screw, an outer surface with at least one inner raceway, a rear lateral surface intended to come to bear against a support for the device, and a forward lateral surface, against which a head of a screw can come to bear, the rings being coaxial and forming a radial space between one another. The bearing is provided with at least one row of rolling elements arranged in the radial space and between the inner and outer raceways.

The pulley is provided with at least one pulley element that is C-shaped in axial section and has an inner portion mounted on the outer surface of the outer ring of the bearing, an outer portion with an outer surface intended to cooperate with the transmission element, and an intermediate portion extending substantially radially between axial ends of the inner portion and outer portion along a first axial side, the pulley element being formed in one piece.

According to the invention, the inner ring of the bearing comprises at least one end portion protruding axially with respect to a lateral surface of the outer ring. At least one pulley element is likewise provided with a lateral portion extending substantially radially from an axial end of the inner portion on the axially opposite side from the intermediate portion, the free end of the lateral portion passing into the immediate vicinity of an outer surface of the axially protruding end portion of the inner ring.

According to further advantageous but non-essential features of the invention, taken on their own or in combination:

The inner ring of the bearing is in one piece.

The inner ring of the bearing comprises a track element provided with an outer surface with at least one inner raceway for the rolling elements, and a spacer provided with an outer surface mounted in a bore of the track element, with the bore intended to take the screw, with a rear lateral surface intended to come to bear against a support for the device, and with a forward lateral surface, against which a head of a screw is intended to come to bear.

The pulley device comprises retaining means that are intended to cooperate with the screw.

The bore of the fixed inner ring comprises an inner circumferential groove in which an annular O-ring cooperating with the screw is housed.

A cage maintains the circumferential spacing of the rolling elements.

The rolling elements are balls.

The inner portion of the pulley element is mounted tightly on an outer surface of the outer ring of the bearing.

The lateral portion of one pulley element comes to bear axially against a lateral surface of the outer ring of the bearing.

The free end of the lateral portion of the pulley element passes into the immediate vicinity of the outer surface of the axially protruding end portion of the inner ring so as to form a narrow passage.

The free end of the lateral portion of the pulley element is provided with a sealing means with at least one sealing lip that comes into sliding contact with the outer surface of the axially protruding end portion of the inner ring.

The sealing means is made of polymer material.

The sealing means is overmoulded on the free end of the lateral portion of the pulley element.

The end portion of the inner ring protrudes axially with respect to the lateral portion of the pulley element.

The end portion is chamfered.

A washer is interposed between the forward lateral surface of the inner ring and the head of the screw.

The washer has an outside diameter strictly greater than the inside diameter of the free end of the lateral portion of the pulley element.

The washer is formed in one piece with the head of the screw.

The end portion is provided with a circumferential trough on its outer surface.

The pulley comprises one pulley element that is C-shaped in axial section.

The pulley comprises two pulley elements that are C-shaped in axial section.

The intermediate portions of the two pulley elements bear axially against one another.

The pulley element is made of metal, for example of steel.

The pulley element is made of plastics material, for example of polyamide.

BRIEF DESCRIPTION OF THE DRAWINGS

The present invention will be understood better from reading the detailed description of embodiments, which are given by way of entirely non-limiting example and are illustrated in the appended drawings, in which.

DETAILED DESCRIPTION

Figure 1:
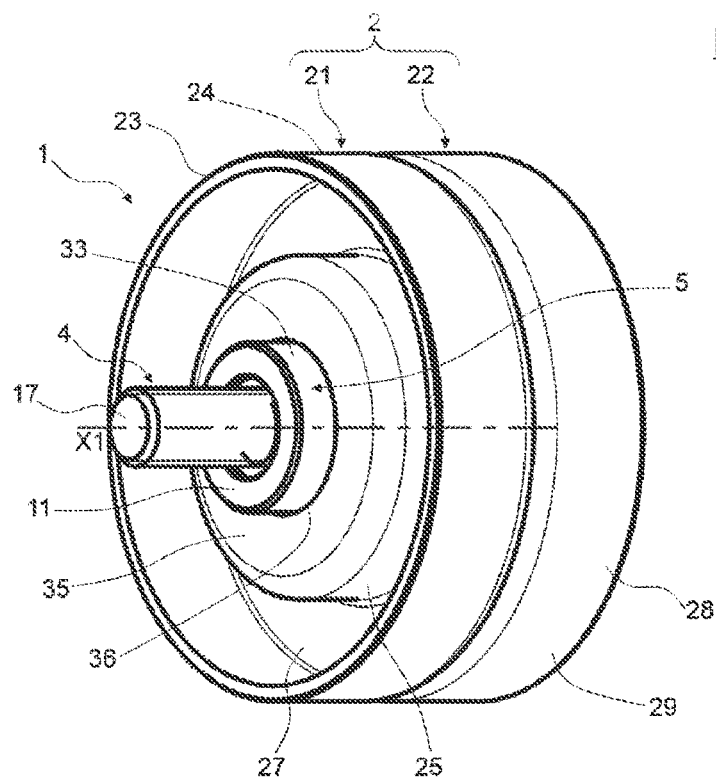
FIG. 1 is a perspective rear view of a pulley device according to a first embodiment of the invention.
Figure 2:
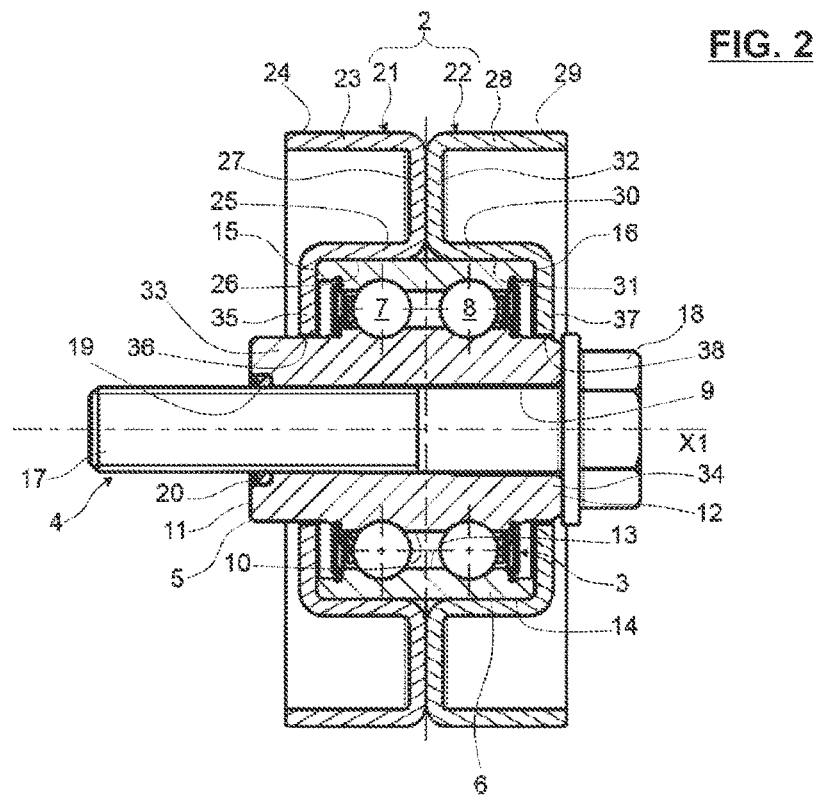
FIG. 2 is a view in axial section of the pulley device in FIG. 1.

As can be seen in FIGS. 1 and 2, a pulley device for a tensioner roller or winding roller of a belt, bearing the overall reference 1, has a geometric axis X1 and comprises a pulley 2 designed to cooperate with a transmission element (not shown) such as a belt or a chain, a bearing 3, and a screw 4.

The bearing 3 comprises a fixed inner ring 5, a rotating outer ring 6, The rings 5, 6 being coaxial about the axis X1. The bearing 3 also comprises two rows of rolling elements 7 and 8, in the form of balls here, that are disposed in a radial space formed between the rings, and cages (not referenced) that maintain the circumferential spacing of the rolling elements 7 and 8, respectively.

The inner ring 5 and outer ring 6 are concentric. In the exemplary embodiment illustrated, the rings are solid, that is to say obtained by machining or grinding with removal of material from metal tubes, bars, forged parts or rolled blanks.

The inner ring 5 comprises a bore 9, a stepped outer surface 10 provided with raceways (not referenced) that have, in axial section, a concave and toroidal internal profile suitable for the rolling elements 7, 8, and a rear lateral surface 11 and a forward lateral surface 12.

The outer ring 6 comprises a stepped cylindrical bore 13 provided with raceways (not referenced) that have, in axial section, a concave and toroidal internal profile suitable for the rolling elements 7, 8, an outer cylindrical surface 14 on which the pulley 2 is mounted, and a rear lateral surface 15 and a forward lateral surface 16.

The fixed inner ring 5 extends axially out of the rotating outer ring 6 in a rearward axial direction towards a support on which the pulley device 1 is intended to be mounted. The fixed inner ring 5 is thus provided with a rearwardly protruding axial end portion 33, the rear lateral surface 11 of which is offset axially with respect to the rear lateral surface 15 of the outer ring 6. The rear lateral surface 11 is intended to form a bearing surface for the bearing 3 against the support for the device 1.

The fixed inner ring 5 also extends axially out of the rotating outer ring 6 in a forward axial direction away from the support on which the pulley device 1 is intended to be mounted. The fixed inner ring 5 is thus provided with a forwardly protruding axial end portion 34, the forward lateral surface 12 of which is offset axially with respect to the forward lateral surface 16 of the outer ring 6. The forward lateral surface 12 is intended to form a bearing surface for the screw 4.

The bearing 3 advantageously comprises, on each axial side, an annular seal (not referenced) for closing the radial space between the rings 5, 6 and inside which the rolling elements 7, 8 are housed.

Alternatively, the bearing may comprise a different number of rows of rolling elements arranged between the outer and inner rings, for example a single row of rolling elements.

Alternatively, the bearing may comprise other types of rolling elements, for example tapered rollers or needles. Alternatively, the bearing may be a plain bearing.

In this embodiment, the inner ring 5 is formed in one piece. According to an alternative embodiment that is not shown, the bearing 3 may comprise an annular spacer mounted in the inner ring 5.

The screw 4 comprises a body 17 and a head 18 at one axial end of The body 17. The body 17 is housed in the bore 9 of the bearing 3, and extends axially beyond the rear lateral surface 11 of the fixed inner ring 6. The body 17 comprises a threaded portion intended to be screwed into a corresponding tapped opening in the support for the pulley device 1. The head 18 of the screw 4 has a relatively flat surface that comes to bear against the forward lateral surface 12 of the inner ring 5 of the bearing 3, on the axially opposite side from the support into which the body 17 is intended to be screwed.

In the embodiment illustrated, the bore 9 of the inner ring 3 is provided with a circumferential groove 19 at its rear end. An annular O-ring 20, preferably elastic, is housed in the groove 19 and cooperates with the body 17 of the screw 4 in order to keep the screw 4 secured to the inner ring 5, and thus to the pulley device 1.

The pulley 2 comprises a rear pulley element 21 and a forward pulley element 22.

The rear pulley element 21 comprises an outer annular portion 23 with an outer cylindrical surface 24 that is able to cooperate with a transmission means, and a cylindrical bore (not referenced). The element 21 also comprises an inner annular portion 25 with a cylindrical bore 26 mounted tightly on the outer cylindrical surface 14 of the rotating outer ring 6 of the bearing 3, and an outer annular surface (not referenced). The outer annular portion 23 is tubular and has a larger diameter than the inner annular portion 25, which is likewise tubular, the outer annular portion 23 radially surrounding the inner annular portion 25. The outer annular portion 23 likewise has an axial dimension greater than the inner annular portion 25, The outer annular portion 23 protruding axially with respect to the inner annular portion 25 on the rear axial side of the device 1.

Finally, the rear pulley element 21 comprises an intermediate portion 27 connecting the inner annular portion 25 and outer annular portion 23. The intermediate portion 27 extends radially between the forward axial ends of the inner portion 25 and outer portion 23 of the rear pulley element 21.

The rear pulley element 21 has the overall shape of a C in axial section, defining an annular opening that is open on the rear axial side of the device 1 in the direction of the support on which the device 1 is intended to be mounted.

The forward pulley element 22 comprises an outer annular portion 28 with an outer cylindrical surface 29 that is able to cooperate with a transmission means, and a cylindrical bore (not referenced). The element 22 also comprises an inner annular portion 30 with a cylindrical bore 31 mounted tightly on the outer cylindrical surface 14 of the rotating outer ring 6 of the bearing 3, and an outer cylindrical surface (not referenced). The outer annular portion 28 is tubular and has a larger diameter than the inner annular portion 30, which is likewise tubular, the outer annular portion 28 radially surrounding the inner annular portion 30. The outer annular portion 28 likewise has an axial dimension greater than the inner annular portion 30, The outer annular portion 28 protruding axially with respect to the inner annular portion 30 on the forward axial side of the device 1.

Finally, the forward pulley element 22 comprises an intermediate portion 32 connecting the inner annular portion 30 and outer annular portion 28. The intermediate portion 32 extends radially between the rear axial ends of the inner portion 30 and outer portion 28 of the forward pulley element 22.

The forward pulley element 22 has the overall shape of a C in axial section, defining an annular opening that is open on the forward axial side of the device 1 in the direction away from the support on which the device 1 is intended to be mounted.

The forward pulley element 21 and rear pulley element 22 are mounted on the rotating outer ring 6 of the bearing 3 such that their intermediate portions 27 and 32, respectively, come to bear radially against one another. The pulley elements 21, 22 are mounted axially in a symmetric manner. The outer cylindrical surfaces 24, 29 of the outer annular portions 23, 28 of the forward pulley element 21 and rear pulley element 22, respectively, form, in combination, a surface for cooperation with a transmission element.

Each of the rear pulley element 21 and forward pulley element 22 are advantageously in one piece and are advantageously formed by cutting out and stamping a metal sheet, for example made of steel.

According to the invention, the rear pulley element 21 is provided with a rear lateral portion 35.

The rear lateral portion 35 extends substantially radially from an axial end of the inner portion 25 axially on the opposite side from the intermediate portion 27 of the rear pulley element 21. The rear lateral portion 35 comes to bear axially against the rear lateral surface 15 of the outer ring 6 of the bearing 3. The rear lateral portion 35 is provided with a free end, which passes into the immediate vicinity of an outer surface of the rearwardly axially protruding end portion 33 of the inner ring 5 so as to form a radial narrow passage 36.

Similarly, and axially on the opposite side from the rear lateral portion 35, the forward pulley element 22 is provided with a forward lateral portion 37. The forward lateral portion 37 extends substantially radially from an axial end of the inner portion 30 axially on the opposite side from the intermediate portion 32 of the forward pulley element 22. The forward lateral portion 37 comes to bear axially against the forward lateral surface 16 of the outer ring 6 of the bearing 3. The forward lateral portion 37 is provided with a free end, which passes into the immediate vicinity of an outer surface of the forwardly axially protruding end portion 34 of the inner ring 5 so as to form a radial narrow passage 38.

Particularly advantageously, the forwardly axially protruding end portion 34 of the inner ring 5 protrudes axially with respect to the forward lateral portion 37 of the forward pulley element 22. In addition, the forwardly axially protruding end portion 34 is chamfered so as to form an additional barrier to the ingress of pollution and water. In an alternative that is not shown, the outer surface of the forwardly axially protruding end portion 34 may be provided with a circumferential trough so as to form a barrier to but also a collector for the pollution and water. Such means can also be provided on the rear face of the inner ring 5.

In an alternative that is not illustrated, one of the front pulley element 21 and the rear pulley element 22 may be provided with a lateral portion.

Figure 3:
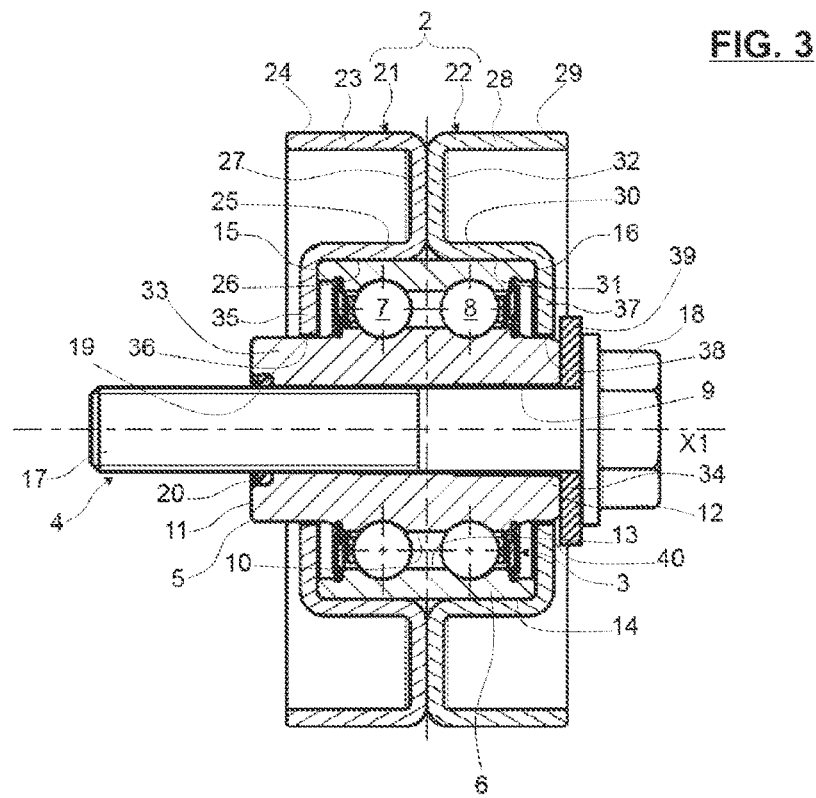
FIG. 3 is a view in axial section of a pulley device according to a second embodiment of the invention.

FIG. 3 illustrates a second embodiment of the invention, in which the same elements have the same references.

In this embodiment, an annular washer 39 is interposed axially between the forward lateral surface 12 of the inner ring and the head 18 of the screw 4. The washer 39 has a central bore in which the body 17 of the screw 4 is housed.

The forward lateral surface 12 is provided at the forwardly axially protruding end portion 34 of the inner ring 5. Thus, the washer 39 is axially offset with respect to the forward lateral portion 37 of the forward pulley element 22.

Particularly advantageously, the outside diameter of the washer 39 is strictly greater than the inside diameter of the free end of the forward lateral portion 37.

The washer 39 advantageously forms an additional barrier for preventing the ingress of pollution or water through the forward narrow passage 38 between the forward lateral portion 37 of the forward pulley element 22 and the inner ring 5.

In addition, an axial narrow passage 40 can advantageously be formed between the washer 39 and the lateral portion 37. The succession of the axial narrow passage 40 and the radial narrow passage 38 forms a labyrinth seal for the device 1.

Figure 5:
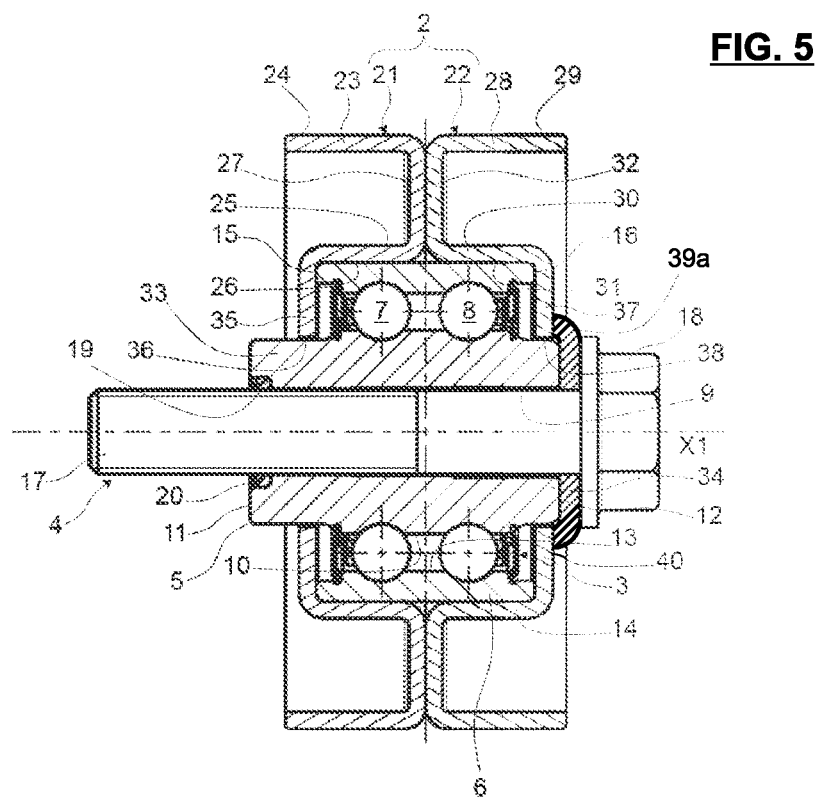
FIG. 5 is a view in axial section of a pulley device according to another embodiment of the invention illustrating a washer seal that contacts the inner ring forward lateral surface and is located between the fastener head and the inner ring forward lateral surface. The washer seal has a second sealing lip that comes into sliding contact with the free end of the lateral portion of the pulley element.

In the embodiment illustrated in FIG. 3, the washer 39 and the head 18 of the screw 4 are separate elements. In an alternative that is not shown, the washer and the head of the screw are formed in one piece. Referring to FIG. 5, the washer seal 39 (also referred to as a washer above) that contacts an inner ring forward lateral surface and is located between the fastener head (also referred to as a screw head above) and the inner ring forward lateral surface. The washer seal 39 has a second sealing lip 39a that comes into sliding contact with the free end of the lateral portion 37 of the pulley element 22.

Figure 4:
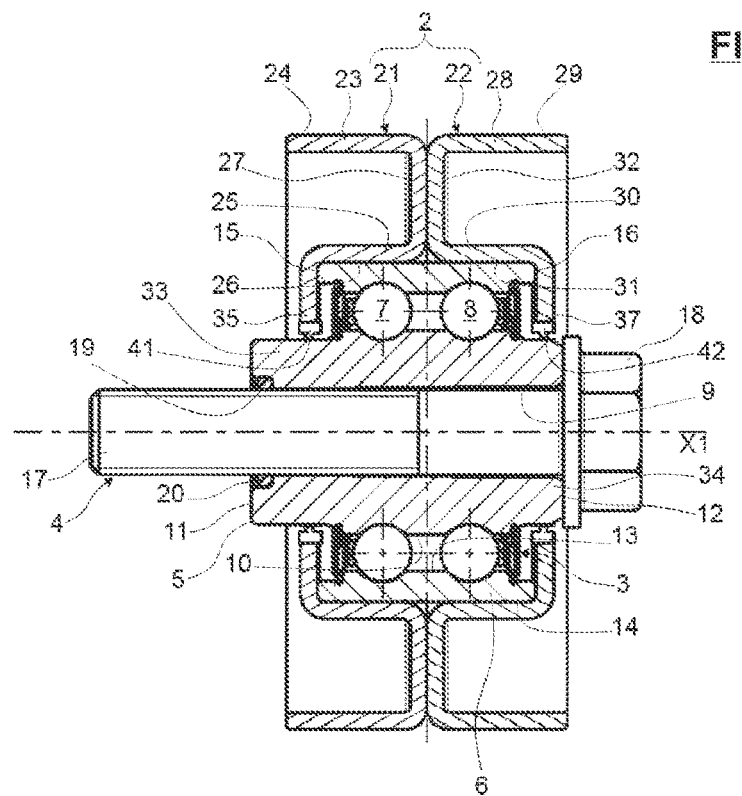
FIG. 4 is a view in axial section of a pulley device according to a third embodiment of the invention.

A third embodiment of the invention is illustrated in FIG. 4, in which the same elements bear the same references.

The free end of the rear lateral portion 35 of the rear pulley element 21 is provided with a sealing means 41 with a lip that comes into sliding contact with the outer surface of the rearwardly axially protruding end portion 33.

Similarly, the free end of the forward lateral portion 37 of the forward pulley element 22 is provided with a sealing means 42 with a lip that comes into sliding contact with the outer surface of the forwardly axially protruding end portion 34.

Advantageously, the sealing means 41, 42 are made of polymer material. The sealing means 41, 42 are preferably overmoulded on the free ends of the rear lateral portion 35 and the forward lateral portion 37, respectively.

By virtue of such an embodiment, it is possible to do away with the sealing means inside the bearing if the application conditions allow.

The embodiments of the invention have been illustrated with a two-part pulley. Alternatively, the pulley device may be provided with a single C-shaped pulley element. In this case, only one lateral portion on one axial side of the device is provided.

Moreover, all or only some of the technical features of the various embodiments can be combined with one another. Thus, the pulley device can be adapted in terms of cost, performance and ease of use.

What is claimed is:

1. A pulley device for a tensioner roller or winding roller for a transmission element, the pulley device comprising:
   a bearing, comprising:
      an outer ring having an outer ring outer surface, the outer ring defining an outer ring bore with at least one outer raceway, an outer ring forward lateral surface, and an outer ring rear lateral surface;
      an inner ring defining an inner ring bore that is configured to accept a fastener, an inner ring outer surface having at least one inner raceway, an inner ring rear lateral surface configured to bear against a support for the pulley device, an inner ring forward lateral surface configured to receive a fastener head thereagainst, a portion of the inner ring which is axially aligned with the at least one row of rolling elements is configured to lay against an outer surface of the fastener; wherein
      the outer ring and the inner ring are coaxial and form a radial space therebetween;
   at least one row of rolling elements arranged in the radial space and between the at least one outer raceway and the at least one inner raceway;
   a pulley having at least one pulley element that is C-shaped in axial section and has:
      an inner pulley portion mounted on the outer ring outer surface;
      an outer pulley portion with an outer pulley surface configured to cooperate with the transmission element, and
      an intermediate pulley portion extending substantially radially between axial ends of the inner pulley portion and the outer pulley portion along a first axial side, the pulley element being formed in one piece;
   the inner ring of the bearing comprises an end portion protruding axially past, and away from the radial space, one of the outer ring forward lateral surface and the outer ring rear lateral surface;
   one of the at least one pulley elements is provided with a lateral portion extending substantially radially from an axial end of the inner pulley portion on the axially opposite side from the intermediate pulley portion, a free end of the lateral portion passing into the immediate vicinity of an outer surface of the end portion of the inner ring; and
   a seal located on the free end of the lateral portion, the seal having a seal lip which is configured to abut the inner ring.

2. The pulley device according to claim 1, wherein the lateral portion of the at least one pulley element comes to bear axially against one of the outer ring forward lateral surface and the outer ring rear lateral surface.

3. The pulley device according to claim 1, wherein the free end of the lateral portion of the pulley element passes into the immediate vicinity of the outer surface of the end portion of the inner ring to form a narrow passage.

4. The pulley device according to claim 1, wherein the fastener further comprises a washer seal which contacts the inner ring forward lateral surface and is located between the fastener head and the inner ring forward lateral surface, the washer seal having a second sealing lip that comes into sliding contact with the free end of the lateral portion of the pulley element.

5. The pulley device according to claim 1, wherein the end portion of the inner ring protrudes axially past, and away from the radial space, the lateral portion of the pulley element.

6. The pulley device according to claim 1, wherein the end portion of the inner ring is chamfered.

7. The pulley device according to claim 1, wherein a washer is interposed between the forward lateral surface of the inner ring and the head of the screw.

8. The pulley device according to claim 7, wherein the washer has an outside diameter greater than the inside diameter of the free end of the lateral portion of the pulley element.

9. The pulley device according to claim 1, wherein the pulley comprises two pulley elements that are C-shaped in axial section, the intermediate pulley portions of each the two pulley elements bearing axially against one another.

10. A pulley device for a tensioner roller or winding roller for a transmission element, the pulley device comprising:
    a fastener,
    a bearing, comprising:
       an outer ring having an outer ring outer surface, the outer ring defining an outer ring bore with at least one outer raceway, an outer ring forward lateral surface, and an outer ring rear lateral surface,
       an inner ring defining an inner ring bore that is configured to accept a fastener, an inner ring outer surface having at least one inner raceway, an inner ring rear lateral surface configured to bear against a support for the pulley device, an inner ring forward lateral surface configured to receive a fastener head thereagainst, a portion of the inner ring which is axially aligned with the at least one row of rolling elements is configured to lay against an outer surface of the fastener, wherein
       the outer ring and the inner ring are coaxial and form a radial space therebetween,
    at least one row of rolling elements arranged in the radial space and between the at least one outer raceway and the at least one inner raceway;
    a pulley having at least one pulley element that is C-shaped in axial section and has:
       an inner pulley portion mounted on the outer ring outer surface,
       an outer pulley portion with an outer pulley surface configured to cooperate with the transmission element, and
       an intermediate pulley portion extending substantially radially between axial ends of the inner pulley portion and the outer pulley portion along a first axial side, the pulley element being formed in one piece;

the inner ring of the bearing comprises at least one end portion protruding axially with respect to a lateral surface of the outer ring, the inner ring of the bearing comprises an end portion protruding axially past, and away from the radial space, one of the outer ring forward lateral surface and the outer ring rear lateral surface, one of the at least one pulley elements is provided with a lateral portion extending substantially radially from an axial end of the inner pulley portion on the axially opposite side from the intermediate pulley portion, a free end of the lateral portion passing into the immediate vicinity of an outer surface of the end portion of the inner ring; and a seal located on the free end of the lateral portion, the seal having a seal lip which is configured to abut the inner ring.

11. The pulley device according to claim 10, wherein the lateral portion of the at least one pulley element comes to bear axially against one of the outer ring forward lateral surface and the outer ring rear lateral surface.

12. The pulley device according to claim 10, wherein the free end of the lateral portion of the pulley element passes into the immediate vicinity of the outer surface of the end portion of the inner ring to form a narrow passage.

13. The pulley device according to claim 10, wherein the end portion of the inner ring protrudes axially past, and away from the radial space the lateral portion of the pulley element.

14. The pulley device according to claim 10, wherein the end portion of the inner ring is chamfered.

15. The pulley device according to claim 10, wherein the pulley comprises two pulley elements that are C-shaped in axial section, the intermediate pulley portions of each the two pulley elements bearing axially against one another.

16. A pulley device for a tensioner roller or winding roller for a transmission element, the pulley device comprising:
a fastener,
a bearing, comprising:
an outer ring having an outer ring outer surface, the outer ring defining an outer ring bore with at least one outer raceway, an outer ring forward lateral surface, and an outer ring rear lateral surface,
an inner ring defining an inner ring bore that is configured to accept a fastener, an inner ring outer surface having at least one inner raceway, an inner ring rear lateral surface configured to bear against a support for the pulley device, an inner ring forward lateral surface configured to receive a fastener head thereagainst, a portion of the inner ring which is axially aligned with the at least one row of rolling elements is configured to lay against an outer surface of the fastener, wherein the outer ring and the inner ring are coaxial and form a radial space therebetween, at least one row of rolling elements arranged in the radial space and between the at least one outer raceway and the at least one inner raceway;

a pulley having at least one pulley element that is C-shaped in axial section and has:
an inner pulley portion mounted on the outer ring outer surface,
an outer pulley portion with an outer pulley surface configured to cooperate with the transmission element, and
an intermediate pulley portion extending substantially radially between axial ends of the inner pulley portion and the outer pulley portion along a first axial side, the pulley element being formed in one piece;

the inner ring of the bearing comprises at least one end portion protruding axially with respect to a lateral surface of the outer ring, the inner ring of the bearing comprises an end portion protruding axially past, and away from the radial space, one of the outer ring forward lateral surface and the outer ring rear lateral surface, one of the at least one pulley elements is provided with a lateral portion extending substantially radially from an axial end of the inner pulley portion on the axially opposite side from the intermediate pulley portion, a free end of the lateral portion passing into the immediate vicinity of an outer surface of the end portion of the inner ring; and a seal located on the free end of the lateral portion, the seal having a seal lip which is configured to abut the inner ring, wherein the fastener further comprises a washer seal which contacts the inner ring forward lateral surface and is located between the fastener head and the inner ring forward lateral surface, the washer seal having a second sealing lip that comes into sliding contact with the free end of the lateral portion of the pulley element.

17. The pulley device according to claim 16, wherein the lateral portion of the at least one pulley element comes to bear axially against one of the outer ring forward lateral surface and the outer ring rear lateral surface.

18. The pulley device according to claim 16, wherein the free end of the lateral portion of the pulley element passes into the immediate vicinity of the outer surface of the end portion of the inner ring to form a narrow passage.

19. The pulley device according to claim 16, wherein the end portion of the inner ring protrudes axially past, and away from the radial space the lateral portion of the pulley element.

20. The pulley device according to claim 16, wherein the end portion of the inner ring is chamfered, wherein the pulley comprises two pulley elements that are C-shaped in axial section, the intermediate pulley portions of each the two pulley elements bearing axially against one another.

* * * * *